No. 760,810. PATENTED MAY 24, 1904.
S. S. SCOTT.
MOTOR VEHICLE.
APPLICATION FILED AUG. 5, 1903.
NO MODEL. 4 SHEETS—SHEET 1.

Witnesses
W. A. Alexander
D. Betjeman

Inventor
Semple S. Scott
By Attorneys
Fowler & Bryson

No. 760,810. PATENTED MAY 24, 1904.
S. S. SCOTT.
MOTOR VEHICLE.
APPLICATION FILED AUG. 5, 1903.
NO MODEL. 4 SHEETS—SHEET 2.
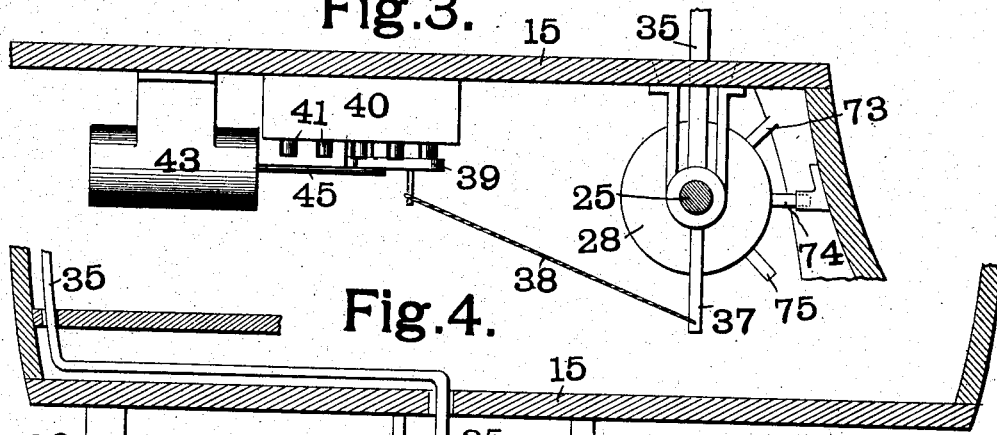
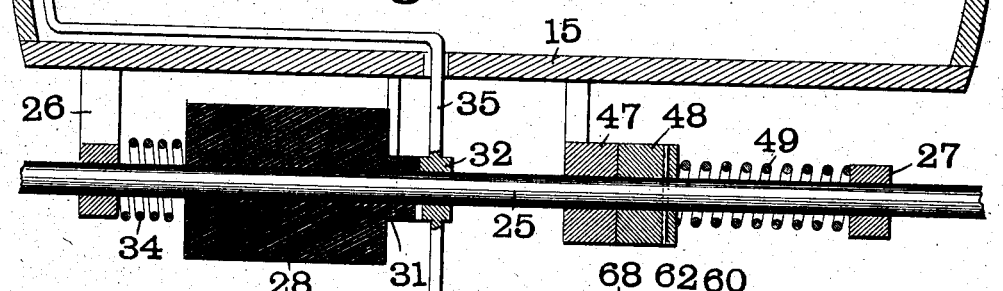
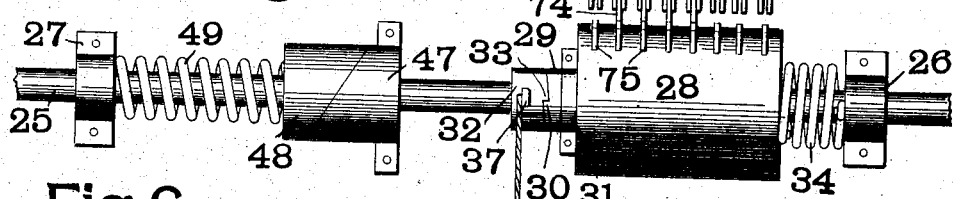
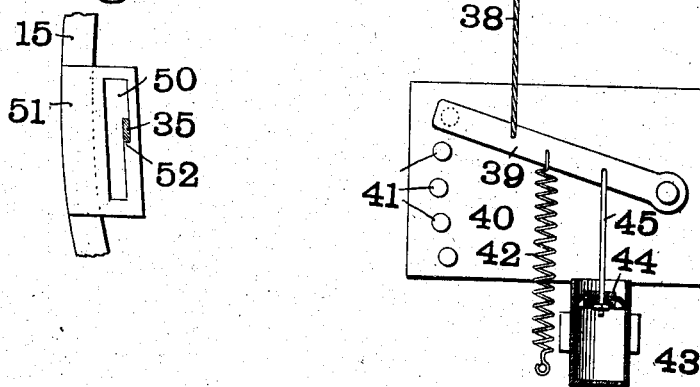
Witnesses
W. A. Alexander
D. C. Betjeman
Inventor
Semple S. Scott
By Attorneys
Fowler & Bryson No. 760,810. PATENTED MAY 24, 1904.
S. S. SCOTT.
MOTOR VEHICLE.
APPLICATION FILED AUG. 5, 1903.
NO MODEL. 4 SHEETS—SHEET 3.
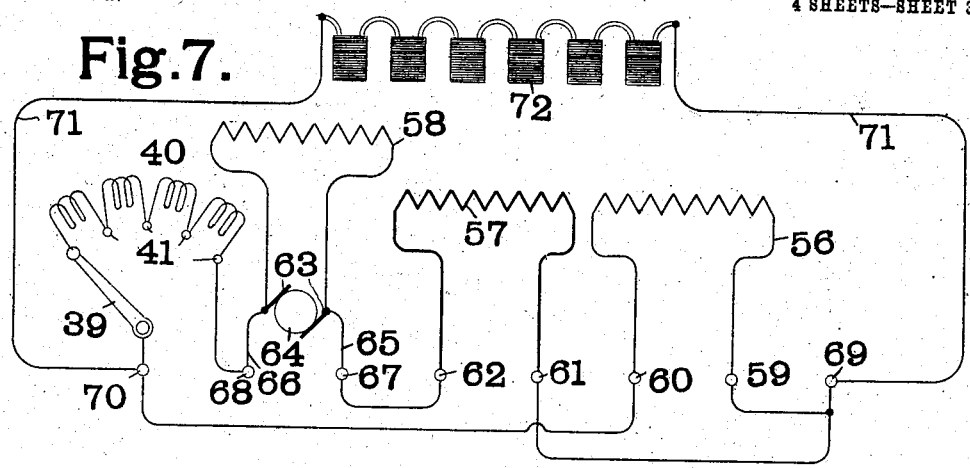
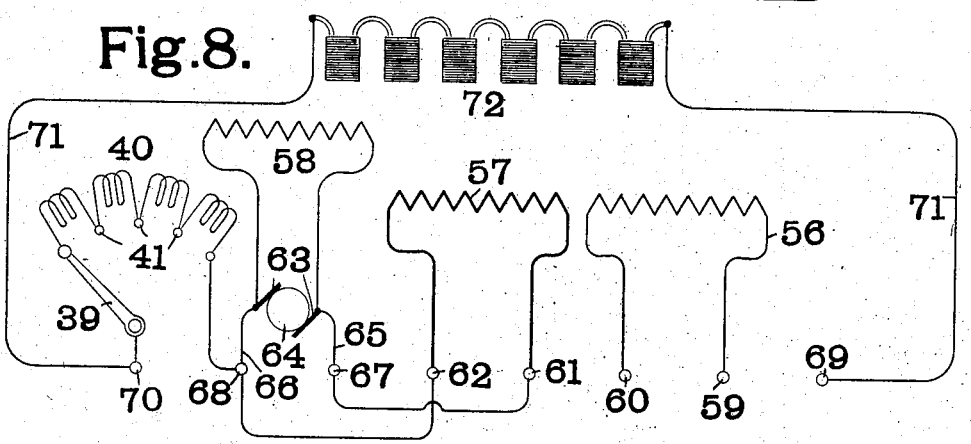
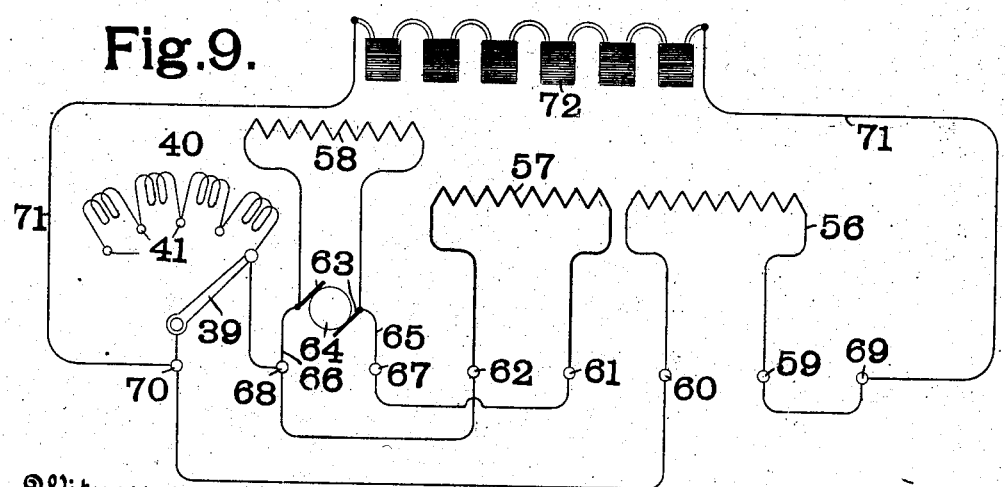
Witnesses
W. H. Alexander
D. C. Betjeman
Inventor
Semple S. Scott
By Attorneys
Towle & Bryson

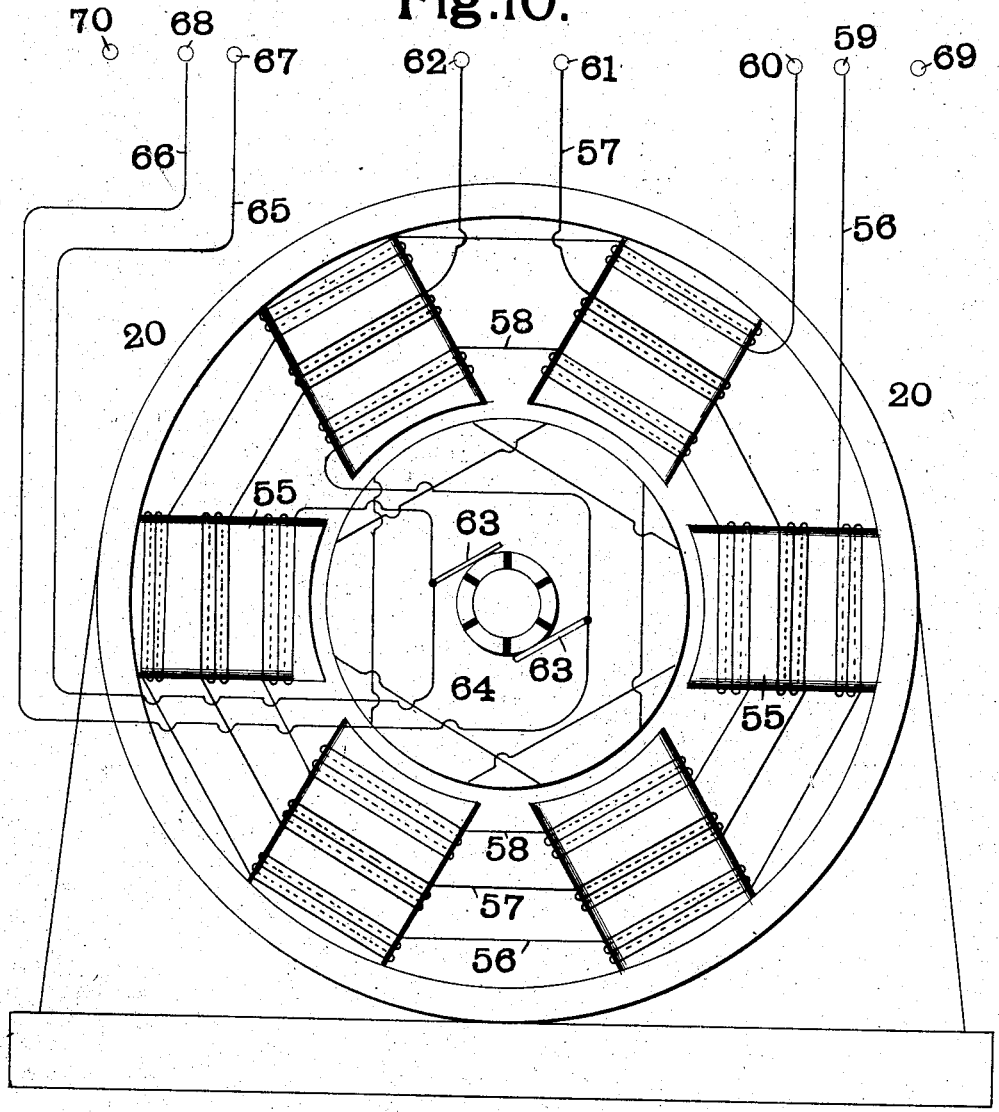

No. 760,810.

Patented May 24, 1904.

UNITED STATES PATENT OFFICE.

SEMPLE S. SCOTT, OF ST. LOUIS, MISSOURI, ASSIGNOR TO THE ELECTRIC AUTO CHAIR COMPANY, OF ST. LOUIS, MISSOURI, A CORPORATION OF MISSOURI.

MOTOR-VEHICLE.

SPECIFICATION forming part of Letters Patent No. 760,810, dated May 24, 1904.

Application filed August 5, 1903. Serial No. 168,303. (No model.)

*To all whom it may concern:*

Be it known that I, SEMPLE S. SCOTT, a citizen of the United States, residing at the city of St. Louis, State of Missouri, have invented a certain new and useful Motor-Vehicle, of which the following is such a full, clear, and exact description as will enable any one skilled in the art to which it appertains to make and use the same, reference being had to the accompanying drawings, forming part of this specification.

One object of my invention is to provide a motor-vehicle with an electric motor which will run at substantially equal speed under all conditions.

Another object of my invention is to provide means for automatically locking the vehicle against motion when it comes in contact with any extraneous object.

Still another object of my invention is to provide means for gradually starting the motor when it is brought into operation.

Figure 1:
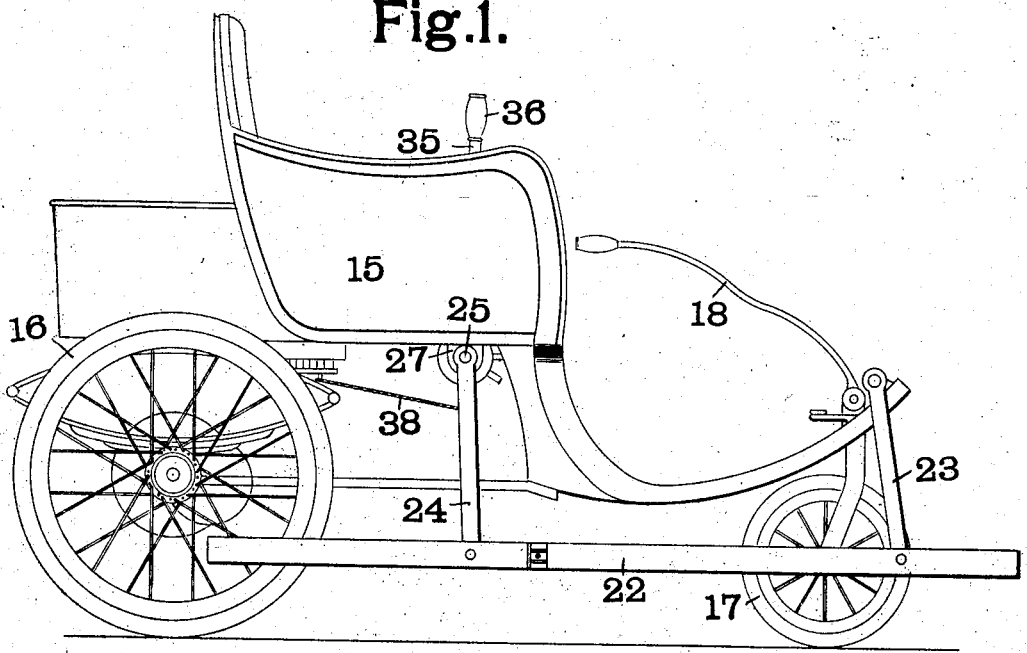
Figure 2:
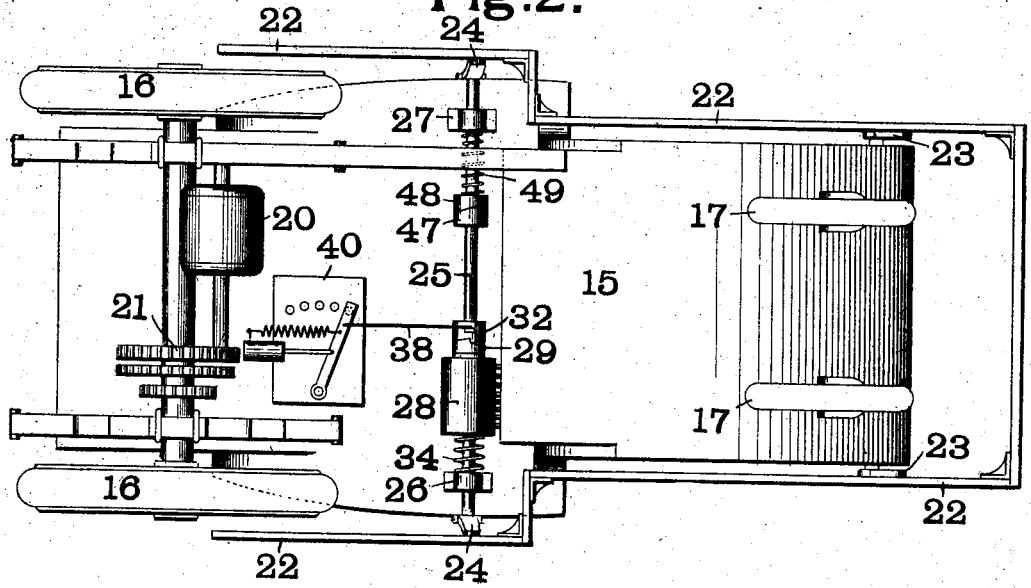

In the accompanying drawings, which illustrate one form of motor-vehicle made in accordance with my invention, Figure 1 is a side view, on a reduced scale, of the complete vehicle. Fig. 2 is a bottom plan view also on a reduced scale. Fig. 3 is a section of a portion of the vehicle taken across the controller-shaft. Fig. 4 is a section taken along the controller-shaft. Fig. 5 is a bottom plan view of the controller-shaft and resistance-box. Fig. 6 is a view showing a detail of construction. Figs. 7, 8, and 9 are diagrammatic views showing the circuits in various positions on the controller, and Fig. 10 is a diagrammatic view of the motor.

Like marks of reference refer to similar parts in the several views of the drawings.

15 is the body of the vehicle, which is preferably made somewhat in the form of a chair, as shown in Figs. 1 and 2 of the drawings, as the vehicle is intended, primarily, for slow speed and to be used as an observation car or vehicle. The body 15 is provided with the usual driving-wheels 16 and steering-wheels 17.

18 is the steering-handle, by means of which the vehicle is guided. Supported beneath the vehicle-body and adjacent to the axle of the rear wheels 16 is a motor 20, which will be described in detail hereinafter. The motor 20 is connected to the axle of the driving-wheels 16 by means of gearing 21 of any usual form.

22 is a guard shaped as best shown in Fig. 2 and suspended from the vehicle-body by means of front hangers 23 and rear hangers 24. The front hangers 23 are pivoted to the front end of the vehicle, and the rear hangers 24 are rigidly secured to the outer ends of a rock-shaft or controller-shaft 25. The controller-shaft 25 is supported beneath the body of the vehicle by bearings 26 and 27. It is evident that when the guard 22 strikes any object it will swing rearwardly, and thus rock the shaft 25 to which it is rigidly connected. This rocking of the shaft 25 will operate to lock the vehicle against movement, as will be hereinafter described.

28 is the controller-cylinder, which is made of any suitable insulating material and surrounds the rock-shaft 25. The controller-cylinder 28 is provided with a projecting sleeve 29, provided with an offset 30. This sleeve 29 is surrounded by a collar 31, secured to the bottom of the vehicle 15, so as to prevent longitudinal movement of the cylinder 28. Adjacent to the sleeve 29 is a second sleeve 32, provided with an offset 33, normally adapted to engage with the offset 31.

34 is a coil-spring attached to one end of the cylinder 28 and at the other to the bearing 26, so as to rotate said cylinder to hold the offset 31 against the offset 33. The collar 32 has projecting upwardly from it a controlling-arm 35. This controlling-arm 35 is preferably shaped as shown in Fig. 4, so as to pass up close to the left-hand side of the vehicle and is provided at its upper end with a handle, as shown in Fig. 1. By means of this handle 36 the vehicle is manually controlled. Projecting downwardly from the collar 32 is a short arm 37, to which is attached one end of a flexible connection 38. The opposite end of this flexible connection 38 is secured to the contact-arm 39 of a resistance-box 40. The end of this arm 39 is adapted to pass over contacts 41, so as to progressively cut the resistance into and out of the circuit, as will be more fully described hereinafter. Attached to the arm 39 is a spring 42, the tension of which tends to pull the arm across the contacts 41, and thus cut the resistance out of circuit. The movement of the arm is accomplished gradually, however, because of a dash-pot 43, in which works a piston 44, connected by a rod 45 to the arm 39, as best shown in Fig. 5.

47 is a cam surrounding the rock-shaft 25 and rigidly secured to the bottom of the vehicle 15. This cam 47 coöperates with a similar cam 48, rigidly secured to the shaft 25. The action of these cams is such that when the shaft 25 is rotated it will be forced toward the right-hand end of the vehicle and will thus have longitudinal movement in the bearings 26 and 27. This movement is opposed by a coil-spring 49, surrounding the said shaft 25 and bearing at one end against the cam 48 and at the other end against the bearing 27. The controller-arm 35, as hereinbefore described, passes up adjacent to the side of the vehicle-body 15 and works in a slot 50 in a plate 51, secured to the said side of the vehicle, as shown in Fig. 6. This slot 50 is provided with an offset 52, against which the arm 35 rests when the motor is out of operative position. When the arm 35 is moved to the forward end of the slot 50, the motor will be thrown into operative position, and when the said arm is moved to the rear end of the slot the motor will be thrown into locked position, as will be more fully described hereinafter.

The motor 20 is provided with steel pole-pieces 55, so that the said motor will retain sufficient magnetism to be self-starting. Surrounding each of these pole-pieces 55 are three separate windings 56, 57, and 58, respectively. The ends of the winding 56 terminate in contacts 59 and 60. The winding 57 has considerably less resistance than the winding 56 and terminates in contacts 61 and 62. The winding 58 is connected across the brushes 63 of the armature 64, and the wires 65 and 66, leading from said armature, are connected to terminals 67 and 68. In addition to these terminals two terminals 69 and 70 are provided. Attached to these terminals 69 and 70 are the circuit-wires 71, leading from the battery 72. Connected to the terminal 68 is one end of the variable resistance 40, and to the terminal 70 is connected the contact-arm 39 of said resistance. The controller-drum 28 hereinbefore described is provided with three sets of contact-fingers 73, 74, and 75, respectively, which are adapted to make contact with the terminals 59, 60, 61, 62, 67, 68, 69, and 70. When the contact-fingers 73 coöperate with the terminals, the circuit will be made, as shown in Fig. 7, the terminal 70 being connected with the terminal 60, the terminal 67 with the terminal 62, the terminals 61 and 59 with the terminal 69, so that the current from the battery 72 will flow in one circuit through the winding 56 and in another circuit through the armature and the winding 57 in series. In all positions of the controller the winding 58 is in shunt around the armature and has the effect of a resistance across the brushes. This circuit connection (shown in Fig. 7) places motor in running condition. When the contact-fingers 74 are in contact with the terminals, the circuits will be as shown in Fig. 8, the terminal 68 being connected with the terminal 62 and the terminal 67 with the terminal 61. This will cut the battery out of circuit and will place the winding 57 in series with the armature. This is the inoperative position of the motor. When the fingers 75 are in contact with the terminals, the circuit will be as shown in Fig. 9. The terminal 70 being connected with the terminal 60, the terminal 68 with the terminal 62, the terminal 67 with the terminal 61, and the terminal 59 with the terminal 69, this will place the winding 57 in series with the armature 64 and will place the winding 56 in series with the battery. This is the locked position of the motor.

The operation of my vehicle is as follows: When the controller-arm 35 is moved to the forward end of the slot 50, the cylinder 28 will be allowed to rotate under the tension of the spring 34, so as to bring the fingers 73 into contact with the terminals. At the same time the flexible connection 38 will be slackened, so as to allow arm 39 to move across the contacts 41 under the tension of the spring 42. The contact of the fingers 73 with the terminals will connect the various circuits of the motor, as shown in Fig. 7, as the resistance 40 in circuit with the armature of motor will be prevented from starting too rapidly, and the dash-pot 43 will compel the arm 39 to move gradually, so that the resistance 40 will slowly be cut out of circuit, so as to allow the motor sufficient time to gain speed. When the motor has gained its normal speed, it will not run any faster, owing to the magnetism of the field being mainly obtained from the shunt-coil 56, which is supplied with current at constant potential by the battery 72. Should, however, the vehicle tend to slow, owing to going upgrade or overload, the armature 64 will rotate more slowly, and consequently reduce its counter electromotive force, so that a stronger current will pass through the coil 57, which is in series with the armature, and thus increase the magnetism of the field to bring the motor up to its normal speed. It will thus be seen that my motor will run at substantially the same speed under all conditions. When the fingers 74 are brought in contact with the terminals by moving the arm 35 into contact with the offset 52, the circuits will be connected, as shown in Fig. 8, the battery being cut completely out of circuit. The low-resistance coil will, however, be placed as a shunt across the armature, so that if the vehicle should be caused to move—as, for instance, going downhill—the armature will act as a brake and will stop the vehicle within a short distance. In case, however, that the vehicle should come in contact with any object it is desirable to stop it more quickly than would be accomplished by this range. For this purpose the third or locking position of the motor is supplied. This locking position of the motor may be obtained either by moving the controller-arm 35 to the rear end of the slot or by the actual contact of the guard 22 with an external object. In case the guard 22 comes in contact with any object it will be swung on its hangers 23 and 24, the hangers 24 being rigidly connected to the shaft 25 and will cause it to rock and through the action of the cams 47 and 48 will force the said rock-shaft toward the right-hand side of the machine. This will move the sleeve 32 away from the sleeve 29, so as to disconnect the offsets 30 and 33, and thus allow the cylinder 28 to move under the tension of the spring 34 and bring the contact-fingers 75 into contact with the terminals and throw the motor into the locking position shown in Fig. 9. In this position the armature will be short-circuited with the winding 57, and at the same time the winding 56 being in circuit with the battery will supply the motor with magnetic field, so that the braking action of the armature 64 will be practically instantaneous.

Having fully described my invention, what I claim as new, and desire to secure by Letters Patent of the United States, is—

1. In a motor-vehicle, the combination with a vehicle-body, of a motor, a controller, manually-operated means for actuating said controller, and a guard carried by said vehicle-body for independently operating said controller.

2. In a motor-vehicle, the combination with a vehicle-body, of a motor adapted to be placed in either an operative or locked condition, and a guard carried by said vehicle-body for automatically changing said motor from the operative to locked condition.

3. In a motor-vehicle, the combination with a vehicle-body, of a motor adapted to be placed in either a running, an inoperative or a locked condition, and a guard carried by said vehicle-body for automatically changing said motor from either a running or inoperative to the locked condition.

4. In a motor-vehicle, the combination with a vehicle-body, of a motor, a controller, manually-operated means for actuating said controller to place said motor in either a running, an inoperative, or a locked condition, and a guard carried by said vehicle-body for independently actuating said controller to bring said motor from either the running or inoperative condition to the locked condition.

5. In a motor-vehicle, the combination with a vehicle-body, of a motor, a rock-shaft, a controller, manually-operated means for actuating said controller independently of said rock-shaft, a guard for actuating said rock-shaft, and means for operating said controller through the movement of said rock-shaft.

6. In a motor-vehicle, the combination with a vehicle-body, of a motor, a rock-shaft, a controller loosely mounted on said rock-shaft, manually-operated means for actuating said controller, a guard carried by said vehicle-body, and connections operated by said guard for disengaging said controller, and manually-operated means.

7. In a motor-vehicle, the combination with a vehicle-body, of a motor, a rock-shaft, a controller loosely mounted on said rock-shaft, manually-operated means engaging with said controller for actuating the same, and a guard carried by said vehicle-body and arranged to move said rock-shaft longitudinally to disengage said controller, and manually-operated means.

8. In a motor-vehicle, the combination with a vehicle-body, of a motor, a variable resistance in circuit with said motor, a controller, an actuating device for said controller, and a flexible connection between said actuating device and variable resistance.

9. In a motor-vehicle, the combination with a vehicle-body, of a motor, a variable resistance in circuit with said motor, a controller, an actuating device for said controller, a connection between said actuating device and controller for actuating the movable member of said variable resistance in one direction only, a spring for actuating said movable member in the other direction, and a retarding device opposing said spring.

10. In a motor-vehicle, the combination with a vehicle-body, of a motor, a variable resistance in circuit with said motor, a controller, an actuating device for said controller, a flexible connection between said actuating device and variable resistance, a spring for actuating said variable resistance, and a dash-pot opposed to said spring.

11. In a motor-vehicle, the combination with a vehicle-body, of a source of electric supply, a motor having its armature connected with said source, and a guard carried by said vehicle-body for automatically short-circuiting said armature.

12. In a motor-vehicle, the combination with a vehicle-body, of a source of electric supply, a motor having its armature connected with said source, a controller for short-circuiting said armature, and a guard carried by said vehicle-body for automatically actuating said controller to short-circuit said armature.

13. In a motor-vehicle, the combination with a vehicle-body, of a source of electric supply, a motor having its armature connected with said source, manually-operated means for short-circuiting said armature, and a guard carried by said vehicle-body for automatically short-circuiting said armature.

14. In a motor-vehicle, the combination with a vehicle-body, of a source of electric supply, a motor having its armature connected with said source, a controller for short-circuiting said armature, manually-operated means for actuating said controller, and a guard for automatically actuating said controller.

15. In a motor-vehicle, the combination with a vehicle-body, of a source of electric supply, a motor having its armature connected with said supply, manually-operated means for short-circuiting said armature, and a guard for automatically short-circuiting said armature through a resistance.

16. In a motor-vehicle, the combination with a vehicle-body, of a source of electric supply, a motor having its armature connected with said source, manually-operated means for short-circuiting said armature, a controller for short-circuiting said armature through a resistance, and a guard for automatically actuating said controller 17. In a motor-vehicle, the combination with a vehicle-body, of a source of electric supply, a motor having an armature and field-coils connected with said source, manually-operated means for short-circuiting said armature, and a guard carried by said vehicle-body for automatically short-circuiting said armature through a portion of said field-coils.

18. In a motor-vehicle, the combination with a vehicle-body, of a source of electric supply, a motor having an armature and field-coils connected with said source, manually-operated means for short-circuiting said armature, a controller for short-circuiting said armature through a portion of said field-coils, and a guard carried by said vehicle-body for automatically actuating said controller.

In testimony whereof I have hereunto set my hand and affixed my seal in the presence of the two subscribing witnesses.

SEMPLE S. SCOTT. [L. S.]

Witnesses:
  W. H. ALEXANDER,
  CHARLES ERD.